US008223705B2

United States Patent
Tao et al.

(10) Patent No.: US 8,223,705 B2
(45) Date of Patent: Jul. 17, 2012

(54) METHOD FOR OPTIMIZING PERFORMANCE IN MULTI-CELL OFDMA NETWORKS

(75) Inventors: Zhifeng Tao, Allston, MA (US); Philip V. Orlik, Cambridge, MA (US); Toshiyuki Kuze, Kanagawa (JP)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 807 days.

(21) Appl. No.: 12/395,993

(22) Filed: Mar. 2, 2009

(65) Prior Publication Data

US 2010/0220682 A1 Sep. 2, 2010

(51) Int. Cl.
*H04W 4/00* (2009.01)
(52) U.S. Cl. ........................................ 370/329
(58) Field of Classification Search .................. 370/320, 370/338–339, 342, 441; 455/1, 63.1, 114.2, 455/278.1, 296
See application file for complete search history.

(56) References Cited

U.S. PATENT DOCUMENTS 8,144,657 B2 * 3/2012 Tao et al. ................. 370/329
2010/0035555 A1 * 2/2010 Bala et al. ................. 455/63.1

OTHER PUBLICATIONS

IST-4-027756 WINNER II, D4.7.2 v1.0, Interference avoidance concepts, 85 pages, 2007.*
Li et al, Downlink Radio Resource Allocation for Multi-Cell OFDMA System, IEEE, 9 pages, Dec. 2006.*

* cited by examiner

*Primary Examiner* — Frank Duong
(74) *Attorney, Agent, or Firm* — Dirk Brinkman; Gene Vinokur

(57) ABSTRACT

A method optimizes a performance of a multi-cell orthogonal frequency-division multiple access (OFDMA) network that includes a set of base stations (BSs) located in a cell, and each BS transmits data on downlink channels to a set of mobile stations (MSs) in the cell. Each BS acquires channel state information (CSI) and inter-cell interference information (ICI) for each downlink channel to each MS in the cell. Each BS selects a power level and a modulation coding scheme level (MCS) for transmitting the data to each MS on the downlink channels based on the CSI and ICI, such that a bit rate is maximized and the ICI is minimized. Then, time and frequency resource are allocated for transmitting the data on the downlink channels to the set of MSs, such that the allocated resources are minimized to optimize the performance of the network.

8 Claims, 8 Drawing Sheets

METHOD FOR OPTIMIZING PERFORMANCE IN MULTI-CELL OFDMA NETWORKS

FIELD OF THE INVENTION

This invention relates generally to power control and interference avoidance in wireless networks, and more particularly to optimizing performance in a multi-cell Orthogonal Frequency Division Multiple Access cellular networks.

BACKGROUND OF THE INVENTION

OFDMA

Orthogonal frequency-division multiplexing (OFDM) is a modulation technique used at the physical layer (PHY) of a number of wireless networks, e.g., networks designed according to the well known IEEE 802.11a/g and IEEE 802.16/16e standards. Orthogonal Frequency Division Multiple Access (OFDMA) is a multiple access scheme based on OFDM. In OFDMA, separate sets of orthogonal tones (subchannels) and time slots are allocated to multiple transceivers (users or mobile stations) so that the transceivers can communicate concurrently. OFDMA is widely adopted in many next generation cellular networks such as 3GPP Long Term Evolution (LTE) and IEEE 802.16m due to its effectiveness and flexibility in radio resource allocation.

Interference in a Multi-Cell OFDMA Network

The fundamental challenge in wireless communications is the inequality between the scarce spectrum that is available, and the vast area to be covered and large number of users to be served. In other words, the same frequency spectrum must be reused in multiple geographical areas or cells. This will inevitably incur inter-cell interference (ICI), when users or mobile stations (MSs) in adjacent cells use the same spectrum. In fact, ICI is the predominant performance-limiting factor for wireless cellular networks.

In order to maximize the spectral efficiency, frequency reuse factor of one is used in OFDMA cell deployment, i.e., the same spectrum is reused in each and every cell. Unfortunately, this high spectrum efficiency is also accompanied by high detrimental ICI. Therefore, a good ICI management scheme on top of OFDMA is needed to leverage the multiple access benefits of OFDMA technology.

Base Station Cooperation (BSC)

Along with OFDMA another widely adopted technology for existing and next generation cellular networks is Multiple Input Multiple Output (MIMO). The technology aims to increase spectral efficiency is the use of multiple antennas at both the transmitter and the receiver. The multiple antenna elements allow for multiple independent spatial channels between the transmitting and receiving terminals which can be used to either increase the spectral efficiency (via spatial multiplexing) or improve the reliability (via antenna beamforming) of communication.

Base station cooperation (BSC) is an extension of the MIMO concept to geographically separated base stations. The technique allows multiple BSs to transmit signals to multiple MSs concurrently sharing the same resource (i.e., time and frequency). It utilizes the SDMA technique for BSs to send signals to MSs cooperatively and is specifically used in cell-edge MSs that are within the transmission ranges of multiple BSs. Effectively the channel among the cooperating base stations and the users can be view as a MIMO channel, albeit with a much larger number of antennas then between a single base station and user. Thanks to cooperation, the interfering signal becomes part of the useful signal. Thus, BSC has two advantages: provision of spatial diversity and ICI reduction.

SUMMARY OF THE INVENTION

A method optimizes performance of a multi-cell orthogonal frequency-division multiple access (OFMDA) network that includes a set of base stations (BSs) located in a cell, and each BS transmits data on downlink channels to a set of mobile stations (MSs) in the cell.

Each BS acquires channel state information (CSI) and inter-cell interference information (ICI) for each downlink channel to each MS in the cell.

Each BS selects a power level and a modulation coding scheme level (MCS) for transmitting the data to each MS on the downlink channels based on the CSI and ICI, such that a bit rate is maximized and the ICI is minimized.

Then, time and frequency resource are allocated for transmitting the data on the downlink channels to the set of MSs, such that the allocated resources are minimized to optimize the performance of the network.

DETAILED DESCRIPTION OF THE PREFERRED EMBODIMENT

Downlink Power Control and Interference Avoidance

The embodiments of the invention provide a method for optimizing a performance of a multi-cell orthogonal frequency-division multiplexing (OFDM) network. The network includes a set of base stations (BSs). Each BS is located in a cell, and each BS transmits symbols on downlink channels to a set of mobile stations (MSs) in the cell.

Figure 1:
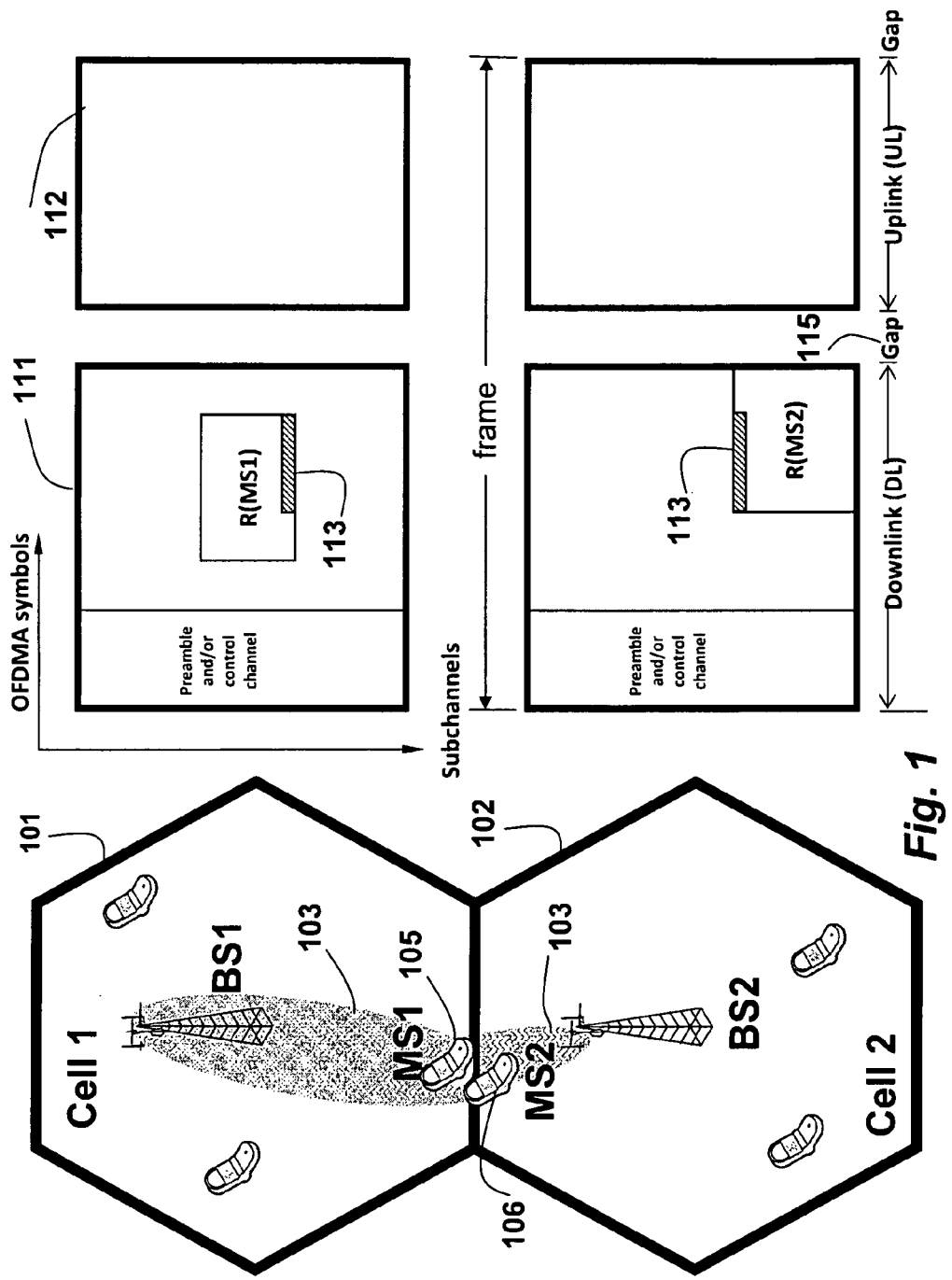
FIG. 1 shows two adjacent cells and the corresponding orthogonal frequency-division multiple access (OFDMA) frame structures.

If cells are adjacent, then the MSs at the edges of the cells can experience inter-cell interference as shown in FIG. 1. In part, the ICI depends on the power levels used by the BSs to transmit the symbols. ICI is the predominant performance-limiting factor for wireless cellular networks. It is desired to minimize ICI, while at the same time maximizing network throughput. Increasing the power can decrease ICI in the cell.

However, ICI in the adjacent cell can increase. Therefore, the optimization needs to be joint across all network parameters for all BSs.

FIG. 1 shows two neighboring cells (cell 1, cell 2) served by BS1 101 and BS2 102. The BS1 and BS2 use downlink transmission power P(MS1) 103 and P(MS2) 104 to transmit to MS1 105 and MS2 106 at modulation coding scheme (MCS) level MC(MS1) and MC(MS2), respectively.

The corresponding OFDMA frame structures are shown on the right in FIG. 1. The frames in cell 1 and cell 2 are synchronized. The frame is partitioned into downlink subframes 111 and uplink subframes 112. The first downlink subframe of both cells starts with preamble and control channel, which are followed by downlink data transmission, a gap 115, and then an uplink subframe. The gap enables the transceivers at the MSs to switch between transmit mode and receive mode.

Note that the OFDMA resource allocated to a user has both time and frequency dimensions. Assume the OFDMA resources needed for MS1 and MS2 are R(MS1) and R(MS2), respectively. R(MS1) and R(MS2) have slight overlap, as indicated by the hatched areas 113 in FIG. 1.

However, the power for downlink transmission from BS1 to MS1 is small enough that it will not cause significant interference to the transmission from BS2 to MS2 in the shaded area. Similarly, the power for transmission from BS2 to MS2 will not cause appreciable interference to the transmission from BS1 to MS1 in the areas 113.

Figure 2:
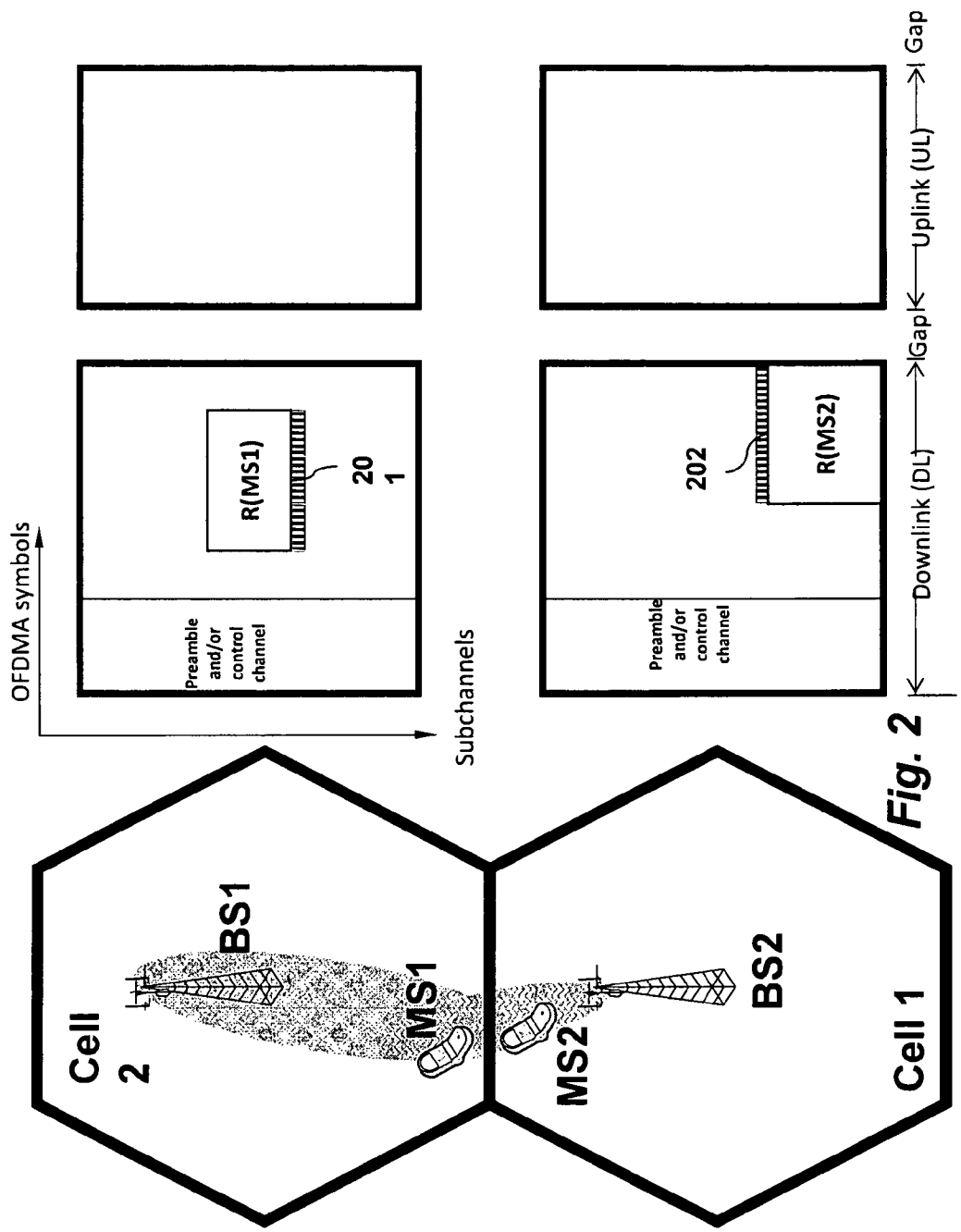
FIG. 2 shows the impact of adjustment in two adjacent cells and the corresponding OFDMA frame structure according to embodiments of the invention.

FIG. 2 depicts the same network deployment scenario. The only difference is that BS1 and BS2 now use a higher power P'(MS1) and P'(MS2) to reach MS1 and MS2, respectively. That is, (P'(MS1)>P(MS1)) and (P'(MS2)>P(MS2)). We call this dynamic power adjustment, because base stations increase more power on MS1 and MS2. Given the increased transmit signal power, the signal-to-interference and noise ratio (SINR) experienced at MS1 and MS2 is improved. The SINR improvement will possibly be big enough that a higher level of modulation and coding scheme (e.g., MC(MS1) and MC(MS2) can be justified. Table I compares some of the available modulation and coding scheme.

TABLE I

| Possible Modulation Scheme | Required SINR level | Data Rate |
| --- | --- | --- |
| Binary Phase-Shift Keying (BPSK) | Low | Low |
| Quadrature Phase-Shift Keying (QPSK) | Medium | Medium |
| 16 Quadrature Amplitude Moducation (QAM) | High | High |
| 64 QAM | Very high | Very high |

With a higher MCS level, smaller size resources can be used to transmit the same number of bits. Thus, the resource area allocated for MS1 and MS2, namely R'(MS1) and R'(MS2) can be smaller than R(MS1) and R(MS2), and the overlap among the two resource allocations can be completely eliminated as shown in FIG. 2. Also note that when we reduce the size of the resource allocations to account for the improved MCS level we obtain some resources/subcarriers 201-202.

If the increased transmission power cannot justify a MCS level, some gain may still be achieved. Increased downlink transmission power can improve the SINR perceived at the mobile stations (e.g., MS1 and MS2), and consequently lower the bit error rate (BER) and reduce the number of possible retransmissions. This is shown in FIG. 3.

Figure 3:
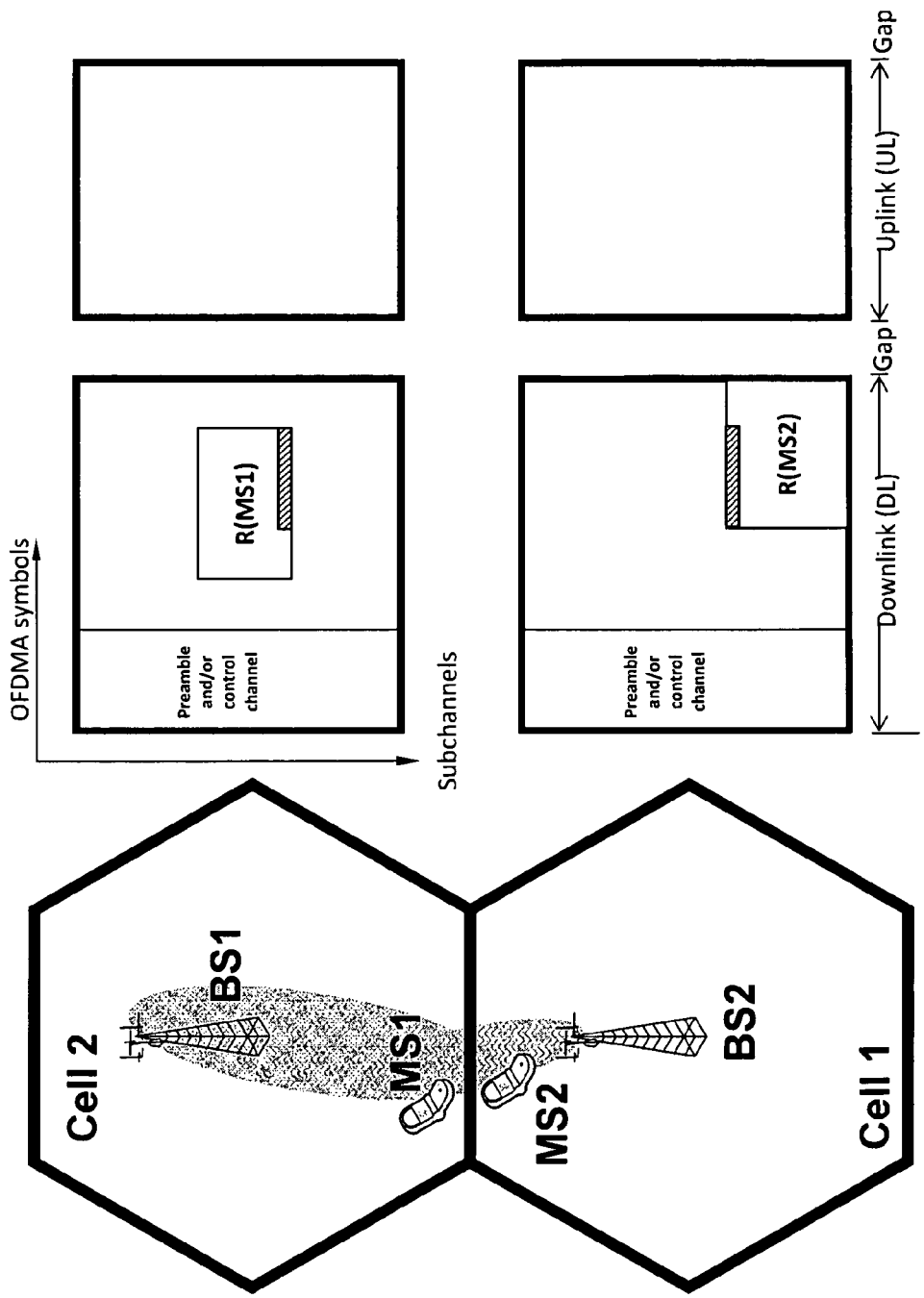
FIG. 3 shows another possible impact of power adjustment in two adjacent cells and the corresponding OFDMA frame structure according to embodiments of the invention.

For the case illustrated in FIGS. 1, 2 and 3, the two base stations involved (i.e., BS1 and BS2) can have very different level of coordination in terms of scheduling. BS1 and BS2 can be completely independent when they schedule the OFDMA resource for MS1 and MS2. As a result, the OFDMA resource allocated to MS1 and MS2 may have undesirable overlap, as shown in FIG. 1.

Figure 4:
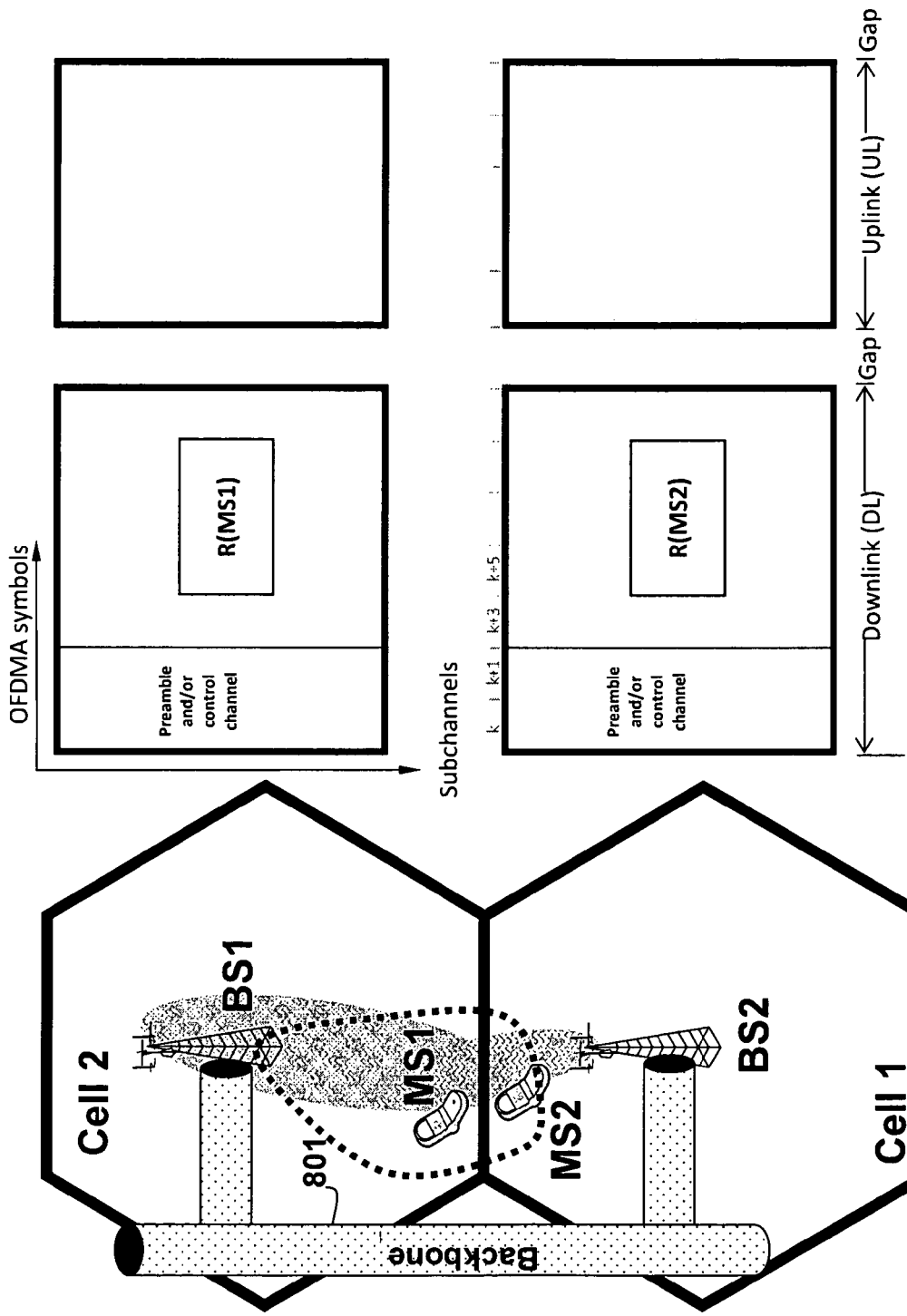
FIG. 4 shows two adjacent cells and the corresponding OFDMA frame structures when base station cooperation is used.
Figure 5:
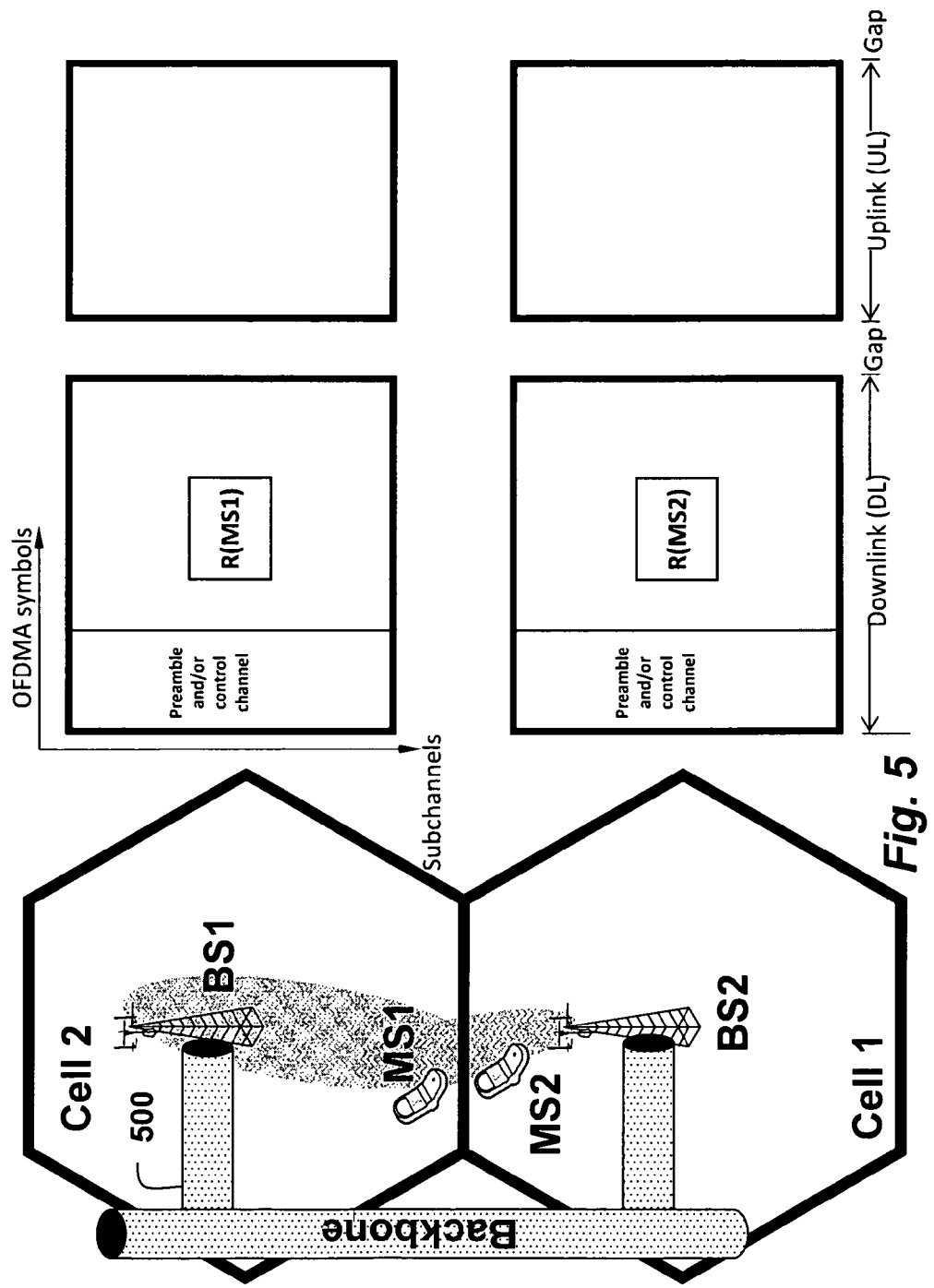
FIG. 5 shows the impact of power adjustment in two adjacent cells and the corresponding OFDMA frame structures according to embodiments of the invention when base station cooperation is used.

It is also possible that these two BSs cooperate via a backbone 801. In that case, BS1 and BS2 will use the same OFDMA resource to communicate to MS1 and MS2, as shown in FIG. 4. If we increase power, then we can reduce the resource size or improve the reliability for the transmission. The ICI can also be eliminated when base station cooperation is enabled. The example for resource usage reduction is provided in FIG. 5.

Figure 6:
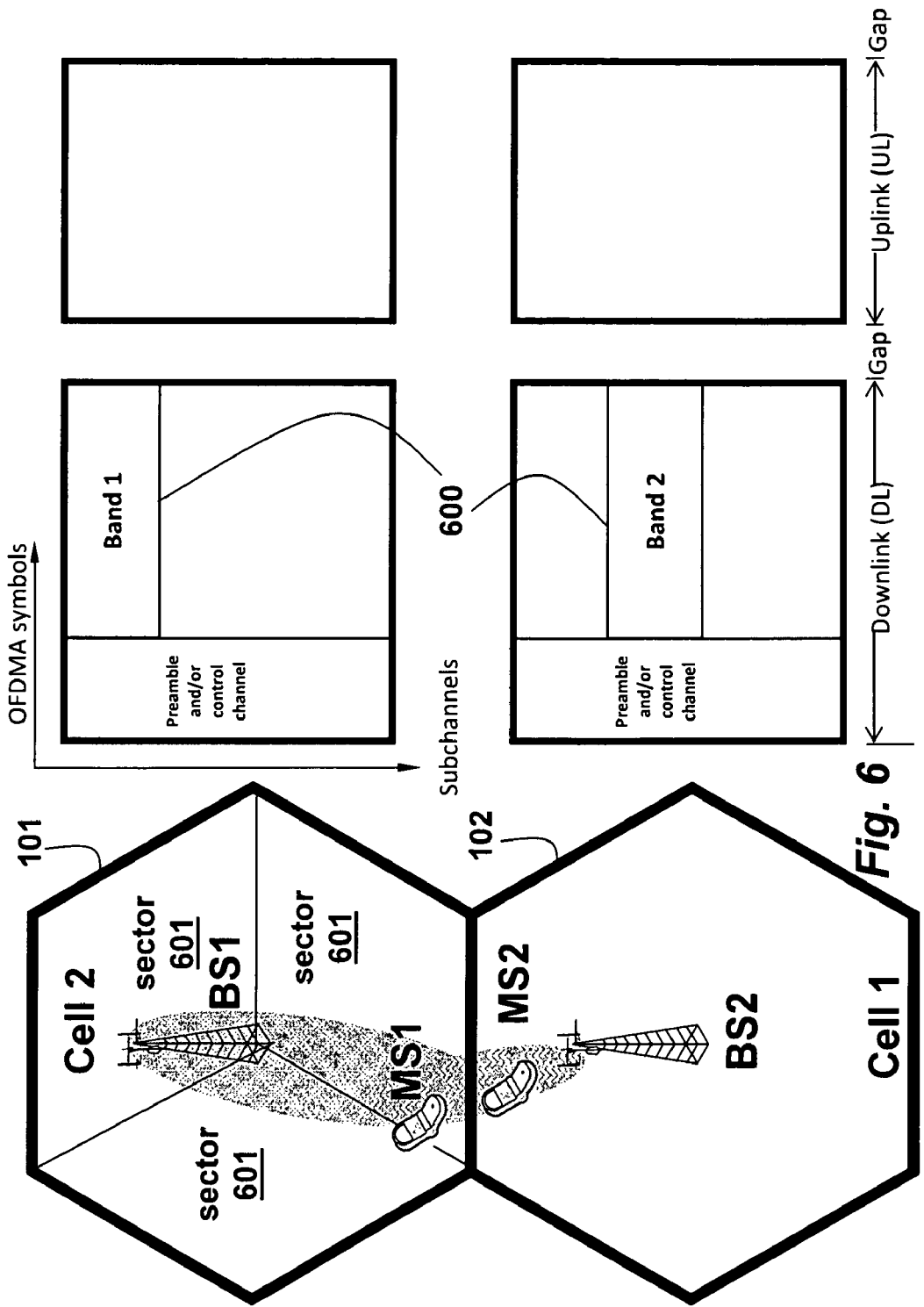
FIG. 6 shows two adjacent cells and the corresponding OFDMA frame structures when each cell uses orthogonal frequency resources.

FIG. 6 shows another type of resource allocation. In this case, each sector or cell uses a segment of the entire spectrum. Thus, since MS1 and MS2 are in two adjacent sectors/cells, they surely will be assigned with non-overlapping OFDMA resources. Thus, increasing the power either enables OFDMA resource reduction, or reliability improvement without increasing any inter-cell interference.

Downlink Power Control and Interference Avoidance in Femtocell

A femtocell base station is a BS with low transmit power, typically installed by a subscriber in home or small-office-home-office (SOHO) to provide the access to closed or open group of users as configured by the subscriber and/or the access provider. A Femtocell BS is connected to the service provider's network via broadband (such as DSL, or cable) or wireless backhaul.

Figure 7:
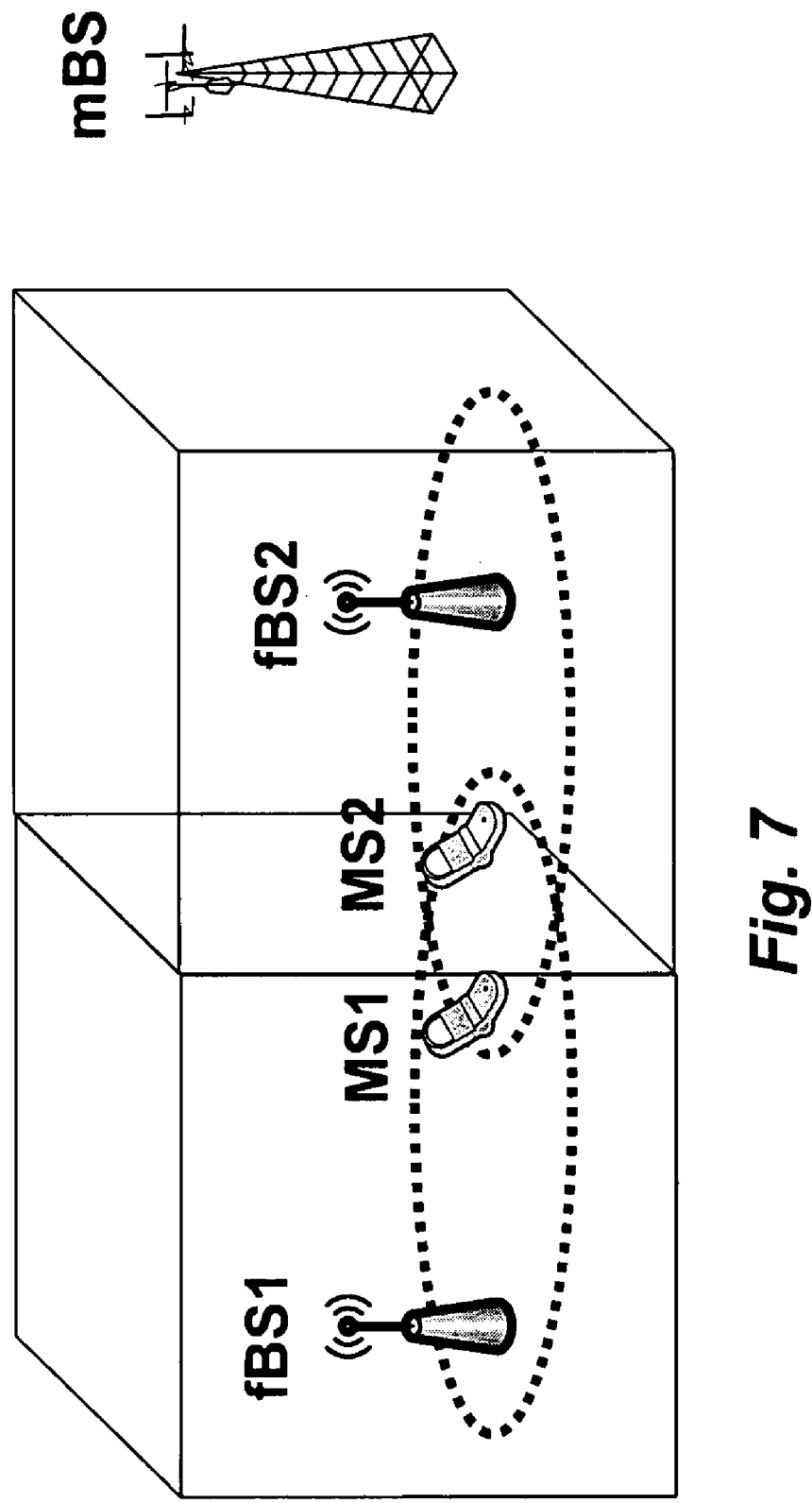
FIG. 7 shows a macrocell and two adjacent femtocells affiliated with the macrocell.

Femtocell BSs typically operate in licensed spectrum and may use the same or different frequency as macro cells. Their coverage may overlap with macro BS. In FIG. 7, mBS is a macro base station, while fBS1 and fBS2 are the two femto base stations that serve MS1 and MS2, respectively. As shown in FIG. 7, fBS1's downlink transmission to MS1 may interfere with that from fBS2 to MS2, and vice versa. This inter-femtocell interference may be more likely to arise, as the distance between two adjacent femtocells is much shorter than that between two adjacent macrocells. To address this issue, power adjustment can be applied.

The application and the benefit of power management in a femtocell are similar to those in a macrocell. For example, fBS1 increases the power for a set of particular uses in its cell (e.g., MS1) so that the downlink transmission to MS1 either becomes more reliable or will occupy less OFDMA resource. The reduction of OFDMA resource usage in fBS1's cell can further reduce the chance that the resource allocated to users in fBS2's cell (e.g., MS2) will overlap with that allocated to users in fBS1's cell (e.g., MS1).

Power reduction is another technique that can help reduce interference. Generally speaking, reducing the downlink transmission power in one femtocell implies the reduction of interference in the neighbor femtocells.

A femto base station can adaptively adjust power. In general, a femto BS first decides the total power for downlink transmission. Then, the femto BS adjusts the power based on the channel condition, traffic load, and other network parameters. For instance, it is difficult to avoid any OFDMA resource allocation overlap in two neighbor femtocells when traffic volume is high. In this case, power reduction may be selected do decrease the inter-cell interference.

Decision Process at Base Station

As defines herein, the base station can generally refer to both a macro base station and a femto base station.

Figure 8:
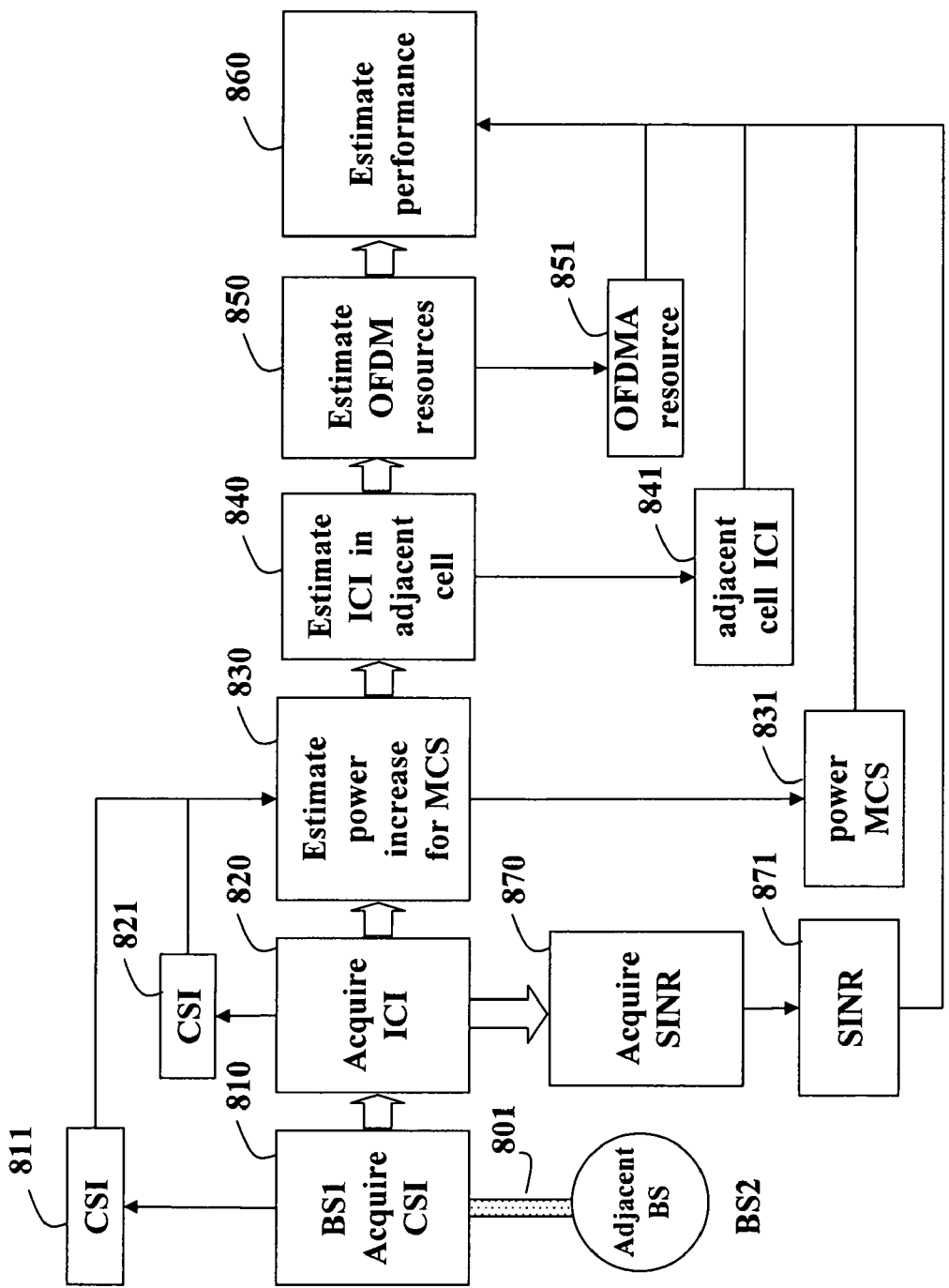
FIG. 8 is a method for optimizing network performance according to embodiments of the invention.

FIG. 8 shows method implemented at a base station to optimize the overall network performance. The method can be performed periodically and dynamically, as network conditions change, e.g., during the gap separating the frames.

The base station acquires 810 channel state information (CSI) 811 on the downlink channel to the MS. The CSI can be acquired either by letting MS report the CSI it perceives on the downlink, the BS can directly measure the CSI on the uplink channel, assuming channel reciprocity in time-division duplex (TDD) network.

The BS also acquires 820 downlink inter-cell interference information (ICI) 821. The MSs can report the ICI to the BS. In addition, the BS can communicate with adjacent BSs, and acquire the ICI to the MSs in the adjacent cell.

Based on the CSI and the ICI, the BS estimates 830 the power required for a particular modulation and coding scheme (MCS) level 831 that maximizes the bit rate, and estimates 840 the ICI 841 this would cause or reduce to the MSs in the adjacent cell. The BS also estimates 840 corresponding OFDMA resources 841 at the power level, with commensurate increased or decreased throughput.

Then, based on the estimates power increase, ICI and resource estimates the BS can estimate 860 whether increasing the power improves the overall performance of the performance.

Optionally, the BS can also estimate 870 how the downlink signal to interference noise ratio (SINR) 871 for the MSs in the cell, and the impact on performance.

The BS can also collaborate 801 with an adjacent BS (BS2) to jointly make the estimates. make the decision in a joint manner. Cooperation among the BSs can assure the best performance.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for optimizing performance of a multi-cell orthogonal frequency-division multiple access (OFDMA) network including a set of base stations (BSs), wherein each BS is located in a cell and each BS transmits data on downlink channels to a set of mobile stations (MSs) in the cell, comprising;
    acquiring, in each BS, channel state information (CSI) and inter-cell interference information (ICI) for each downlink channel to each MS in the cell;
    selecting, in each BS, a power level and a modulation coding scheme level (MCS) for transmitting the data to each MS on the downlink channels based on the CSI and ICI, such that a bit rate is maximized and the ICI is minimized; and
    allocating time and frequency resource for transmitting the data on the downlink channels to the set of MSs, such that the allocated resources are minimized to optimize the performance of the network.

2. The method of claim 1, wherein the optimizing is performed dynamically.

3. The method of claim 1, wherein the data are transmitted in frames separated by gaps, and each frame includes a downlink subframe and an uplink subframe, and the optimization is performed on a per-frame basis.

4. The method of claim 1, further comprising:
    acquiring, in each BS, signal to interference and noise information (SINR) for each downlink channel to each MS in the cell; and
    selecting, in each BS, the power level and the MCS for transmitting the data to each MS on the downlink channels based on the SINR.

5. The method of claim 1, wherein the MCS include Binary Phase-Shift Keying, Quadrature Phase-Shift Keying, 16 Quadrature Amplitude Moducation (QAM), and 64 QAM.

6. The method of claim 1, wherein the steps are performed independently in each BS.

7. The method of claim 1, wherein the steps are performed cooperatively by the set of BSs.

8. The method of claim 1, wherein the network includes femtocell base stations.

* * * * *